United States Patent [19]

Shido et al.

[11] Patent Number: 5,517,482

[45] Date of Patent: May 14, 1996

[54] INFORMATION RECORDING/REPRODUCING APPARATUS HAVING FUZZY OPERATING UNIT

[75] Inventors: Shunichi Shido, Sagamihara; Katsunori Hatanaka, Yokohama; Kunihiro Sakai, Isehara; Takahiro Oguchi, Ebina; Akihiko Yamano, Sagamihara, all of Japan

[73] Assignee: Canon Kabushiki Kaisha, Tokyo, Japan

[21] Appl. No.: 312,182

[22] Filed: Sep. 26, 1994

[30] Foreign Application Priority Data

May 20, 1992 [JP] Japan ................. 4-127013

[51] Int. Cl.⁶ .............. G11B 9/00; G05B 13/02
[52] U.S. Cl. .......... 369/126; 369/124; 250/306; 250/307; 395/61; 395/900
[58] Field of Search ............ 369/44.25, 44.26, 369/44.34–44.36, 44.28, 44.29, 126, 124; 395/900; 360/69, 77.01; 250/306, 307

[56] References Cited

U.S. PATENT DOCUMENTS

| | | | |
|---|---|---|---|
| 5,130,554 | 7/1992 | Nose et al. | 250/548 |
| 5,202,879 | 4/1993 | Oguchi et al. | 369/126 |
| 5,247,432 | 9/1993 | Ueda | 395/900 |
| 5,270,880 | 12/1993 | Ottesen et al. | 360/60 |
| 5,287,432 | 2/1994 | Tomitaka | 360/77.01 |
| 5,299,184 | 3/1994 | Yamano et al. | 369/126 |
| 5,357,421 | 10/1994 | Tautz et al. | 360/69 |
| 5,371,727 | 12/1994 | Shido et al. | 369/126 |
| 5,375,114 | 12/1994 | Hatanaka et al. | 369/126 |
| 5,404,349 | 4/1995 | Nose et al. | 369/126 |

FOREIGN PATENT DOCUMENTS

| | | |
|---|---|---|
| 63-161552 | 7/1988 | Japan. |
| 63-161553 | 7/1988 | Japan. |

OTHER PUBLICATIONS

Binnig, et al., "Scanning Tunneling Microscopy," Helvetica Physica Acta, vol. 55, No. 6, (Dec. 1982), pp. 726 through 735.

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

A recording/reproduction of information is performed on a recording medium using a probe as follows. The relative movement between the probe and the recording medium along a track groove of the medium is performed on the basis of a predetermined drive signal. A voltage is applied to between the probe and the recording medium. A tunnel current flowing through the probe upon application of the voltage is detected so as to detect the track groove. A correction signal for correcting the drive signal is obtained on the basis of fuzzy deduction. The probe and the recording medium are driven relative to each other along the track groove in accordance with a drive signal corrected by the correction signal.

8 Claims, 6 Drawing Sheets

INFORMATION RECORDING/REPRODUCING APPARATUS HAVING FUZZY OPERATING UNIT

BACKGROUND OF THE INVENTION

1. Field of the Invention

The present invention relates to an information recording/reproducing apparatus and method which can record, reproduce, and erase information along a track groove formed in a recording medium by utilizing physical phenomena caused when a probe is brought near a sample.

2. Related Background Art

A scanning tunneling microscope (to be abbreviated to an STM hereinafter) has recently been developed [G. Binnig et al., Helvetica Physica Acta, 55,726 (1982)], which allows direct observation of electron structures on and near the surface of a substance by utilizing physical phenomena (tunnel effect and the like) caused when a probe is brought near a sample. With this instrument, a real spatial image of a substance can be observed with high resolution regardless of whether the substance has a single-crystal or amorphous structure. The STM allows observation with low power without damaging a medium with a current. In addition, the STM can be operated in the open air and a solution as well as in an ultrahigh vacuum and can be applied to various materials. Therefore, STM is expected to find wide applications in the scientific fields and the fields of study and research.

In the industrial field, a great deal of attention has recently been paid to the principle of STM having a spatial resolution corresponding to an atomic or molecular size, and much effort has been made to realize a practical application of STM to an information recording/reproducing apparatus, using recording layers (e.g., thin films consisting of $\pi$-electron organic compounds and chalcogen compounds) for recording media, as disclosed in Japanese Laid-Open Patent Application Nos. 63-161552 and 63-161553.

It is a principal object of such an information recording/reproducing apparatus to record information on the surface of a sample medium by some electrical method while sweeping the probe parallel to the sample surface, and reproduce the recorded information by measuring physical phenomena (a tunnel current or the like) caused when the probe is brought near the sample.

In such a case, in order to smoothly perform recording and reproduction of information, information must be aligned on the sample according to a certain rule. It is preferable that a groove for tracking (to be referred to as a track groove hereinafter) be formed in the recording medium, and that the track groove be detected and used as a reference to perform information write and read operations.

In an information recording/reproducing apparatus having the above-described arrangement, a tunnel current signal is used for detecting the track groove, similar to reproduction of recorded information. For example, at the instant that the probe passes a steep edge portion of the track groove, distance control cannot properly respond because the time constant of a distance control circuit for the sample and the probe is finite. As a result, the distance between the sample and the probe increases. At this time, a decrease in tunnel current is observed. The position of the groove can be detected by comparing the decrease in tunnel current with a reference current value.

Since a tunnel current signal is used for detecting the track groove, track groove detection is very sensitive to recesses/projections on the sample surface. For this reason, if the scanning speed is increased, the frequency of a correction output for a Z-direction control signal becomes higher than a mechanical resonance frequency in the Z direction. As a result, it becomes difficult for distance control between the sample and the probe to conform 100% to the spatial frequency of recesses/projections on the sample surface. That is, the relationship between the scanning speed and the sample-probe distance control becomes unstable, and the detected tunnel current is greatly influenced accordingly.

As is apparent, it is difficult to stably detect the track groove by using the above-described method, and hence the position of the track groove is erroneously detected.

Assume that an error occurs in the detection of the position of the track groove (actually, the detection of the position of the track groove edge), as described above. If a bit information signal is to be read by using the detected position as a reference, the possibility that information is read from a wrong portion increases, resulting in a deterioration in the reliability of the read information. For this reason, error correction must be performed to compensate for the deterioration in reliability, or the scanning speed needs to be decreased. This causes a decrease in recording information density due to an increase in the number of redundant bits, or a decrease in recording/reproducing speed.

SUMMARY OF THE INVENTION

The present invention has been made in consideration of the above-described problems of the conventional techniques, and has as its object to provide an information recording/reproducing apparatus which can reduce track groove detection errors, and can perform information recording, reproducing, and erasing operations, or can perform two or more such operations, with high precision and at high speed.

In order to achieve the above object, there is provided an information recording/reproducing apparatus for performing at least an information recording or reproducing operation with respect to a recording medium having a track groove by using a probe.

The apparatus comprises a probe, moving means for moving the probe and the recording medium relative to each other in a medium surface direction, driving means for driving the moving means in accordance with a predetermined drive signal, voltage applying means for applying a voltage between the probe and the recording medium, tunnel current detecting means for detecting a tunnel current flowing in the probe upon application of the voltage, track groove detecting means for detecting the track groove on the basis of the detected tunnel current signal, position detecting means for detecting a relative positional relationship between the track groove and the probe on the basis of an output from the track groove detecting means, and fuzzy operating means for calculating a correction signal for correcting the drive signal by fuzzy deduction on the basis of a relative position detected by the position detecting means. The moving means is driven on the basis of a drive signal corrected by the correction signal.

In addition, there is provided an information recording/reproducing method of performing at least an information recording or reproducing operation with respect to a recording medium having a track groove, along the track groove, by using a probe. The method comprises the steps of driving the probe and the recording medium relative to each other along the track groove in accordance with a predetermined drive signal, applying a voltage between the probe and the recording medium, detecting a tunnel current flowing in the probe upon application of the voltage, detecting the track groove on the basis of the detected tunnel current, and calculating a correction signal for correcting the drive signal by fuzzy deduction when the track groove is detected in the track groove detection step. In the driving step, the probe and the recording medium are driven relative to each other along the track groove in accordance with a drive signal corrected by the correction signal.

The present invention will be described in detail in the following detailed description of the preferred embodiments.

DETAILED DESCRIPTION OF THE PREFERRED EMBODIMENTS

Embodiments of the present invention will be described below with reference to the accompanying drawings.

Figure 1:
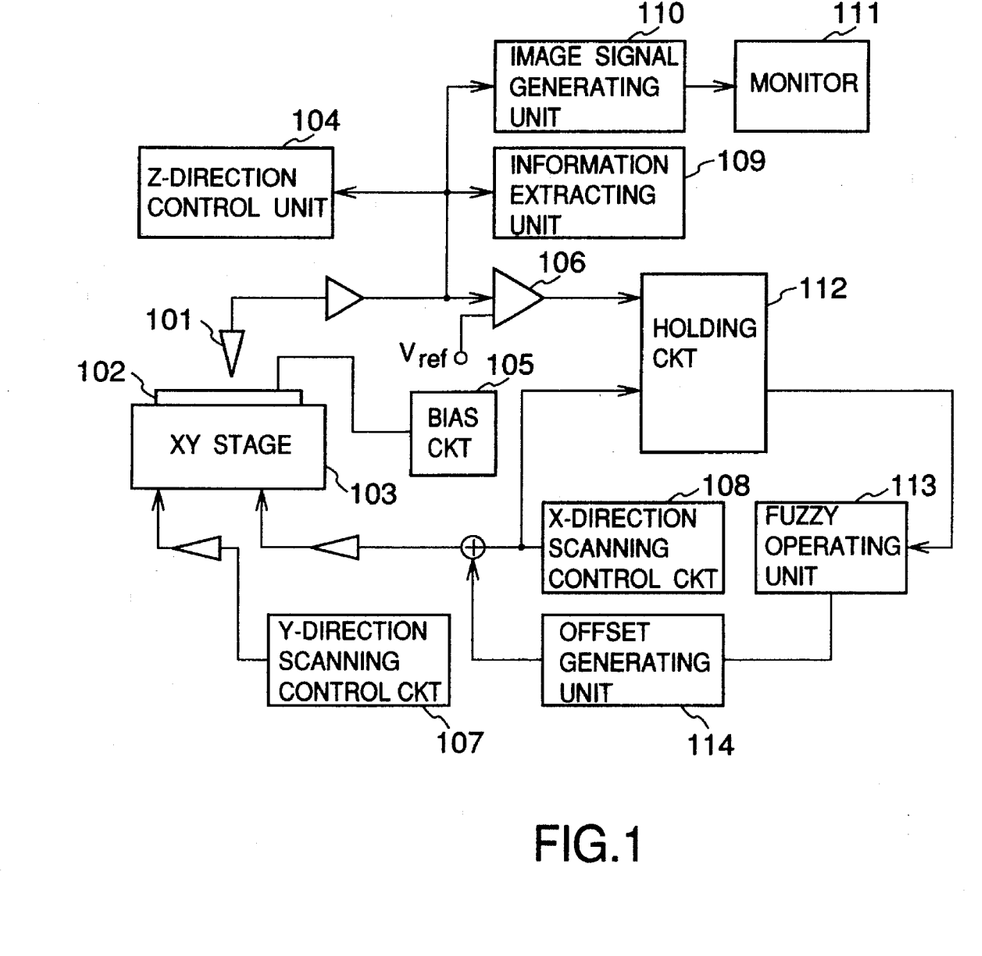
FIG. 1 is a block diagram showing an arrangement of an information recording/reproducing apparatus according to an embodiment of the present invention.

FIG. 1 is a block diagram showing an arrangement of an embodiment of the present invention.

This embodiment is an information recording/reproducing apparatus using an Au electrode, as a sample, which has a track groove (recess portion) formed by a semiconductor process. The operation of each component in the block diagram of FIG. 1 will be described first.

A predetermined voltage is applied between a probe 101 and a sample 102 by a bias circuit 105. A Z-direction control unit 104 as a position control mechanism serves to perform position control of the probe 101 in the Z direction (the vertical direction in FIG. 1). The Z-direction control unit 104 detects a tunnel current which flows when a bias voltage is applied between the probe 101 and the sample 102, and controls the distance therebetween such that the detected value is kept constant. A scanning mechanism for performing a scanning operation in a direction parallel to the sample surface is constituted by a Y-direction scanning control circuit 107 and an X-direction scanning control circuit 108. A scanning operation is performed by moving an XY stage 103 using these circuits 107 and 108.

The tunnel current flowing between the probe 101 and the sample 102 upon application of the bias voltage is supplied to an image signal generating unit 110 for outputting the contents, recorded on the sample 102, as an image signal, an information extracting unit 109, and a comparator 106 as a detecting means, in addition to the Z-direction control unit 104.

The image signal generating unit 110 generates image data based on the surface state of the sample 102 in accordance with the supplied tunnel current, and outputs the data to a monitor 111. The monitor 111 displays an image represented by the image data.

The information extracting unit 109 is a unit for extracting information, recorded on the sample 102, as a digital or analog value, from the supplied tunnel current. The comparator 106 compares the current value of the supplied tunnel current with a preset reference current value Vref indicating that a scanned area is an edge portion of the track groove. When the current value of the tunnel current becomes smaller than the reference current value Vref, i.e., an edge of the track groove is detected, the comparator 106 sends a pulse signal having a predetermined width and amplitude indicating this detection result to a holding circuit 112.

In this embodiment, scanning in the X and Y directions is performed by applying scanning voltages, respectively output from the Y- and X-direction scanning control circuits 107 and 108, to a plurality of piezoelectric elements (not shown) mounted on the XY stage 103 in the Y and X directions, respectively.

A scanning voltage output from the X-direction scanning control circuit 108 is held by the holding circuit 112 at the timing of a pulse signal output from the comparator 106 (i.e., at the timing when an edge of the track groove is detected), and is sent to a fuzzy operating unit 113 at the next stage. The fuzzy operating unit 113 processes the held data as tracking data to calculate a feedback amount. The feedback amount calculated by the fuzzy operating unit 113 is supplied to an offset generating unit 114. The offset generating unit 114 generates an offset value from the supplied feedback amount, and applies it to the piezoelectric elements for driving the XY stage 103 in the X direction together with the scanning voltage output from the X-direction scanning control circuit 108.

In the present embodiment, a tracking mechanism is constituted by the holding circuit 112, the fuzzy operating unit 113, and the offset generating unit 114.

An operation of the fuzzy operating unit 113 will be described next with reference to FIG. 2.

Figure 2:
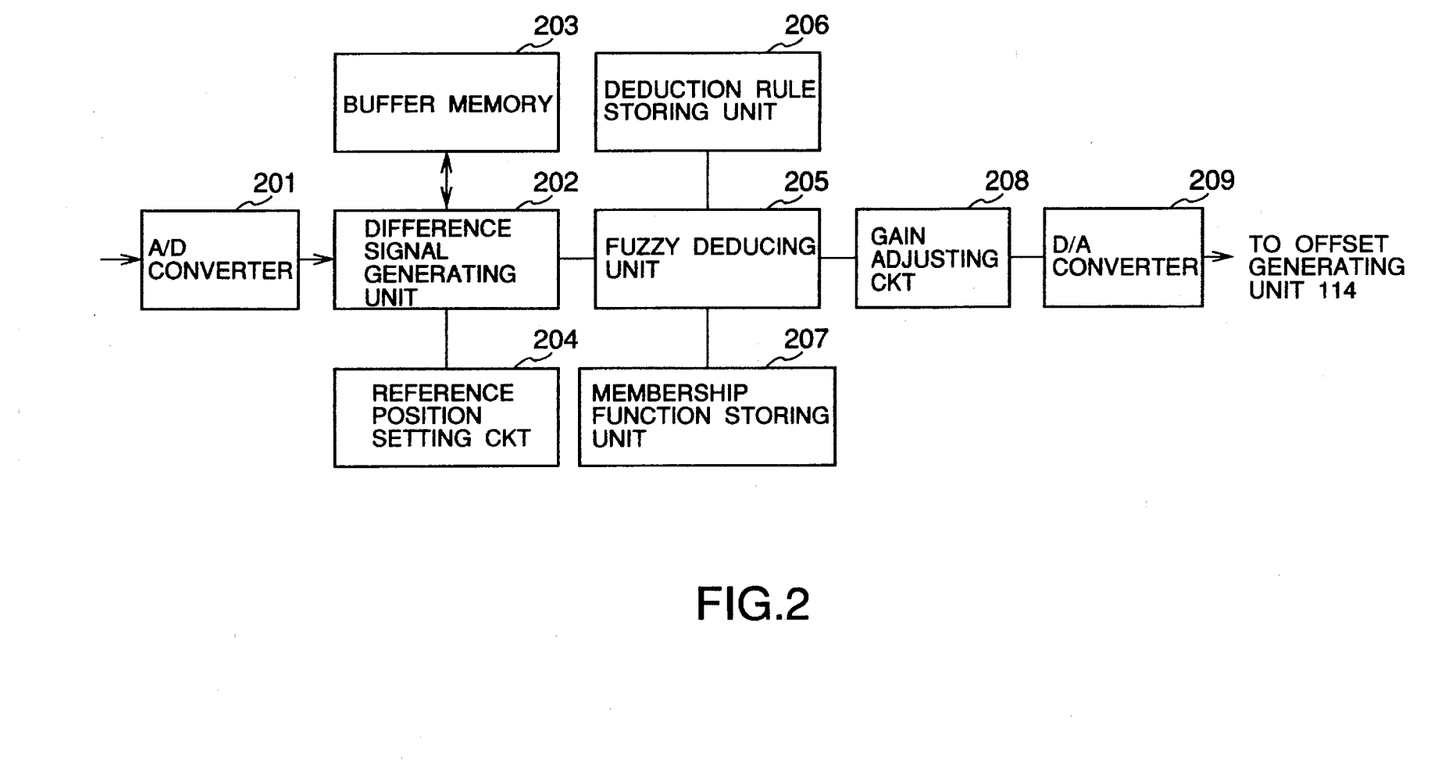
FIG. 2 is a block diagram showing a detailed circuit arrangement of a fuzzy operating unit 113 in FIG. 1.

FIG. 2 is a block diagram showing the detailed circuit arrangement of the fuzzy operating unit 113 in FIG. 1.

As shown in FIG. 2, the fuzzy operating unit 113 comprises an A/D converter 201, a difference signal generating unit 202, a buffer memory 203, a reference position setting circuit 204 for outputting a signal whose voltage value indicates a reference position for tracking, a fuzzy deducing unit 205, a deduction rule storing unit 206, a membership function storing unit 207, a gain adjusting circuit 208, and a D/A converter 209.

An output from the holding circuit 112 is converted into a digital value by the A/D converter 201 and is numerically operated upon as follows.

In the difference signal generating unit 202, a difference signal $e$ (first difference signal) between the digital value and an output from the reference position setting circuit 204 is obtained. The difference signal $e$ is stored in the buffer memory 203. At the same time, a second difference signal $e'$ between the current difference signal $e$ and a previous difference signal e stored in the buffer memory 203 is obtained. The difference signals are then output to the fuzzy deducing unit 205.

The fuzzy deducing unit 205 performs fuzzy deduction of each input difference signal according to a deduction rule stored in the deduction rule storing unit 206 and a membership function stored in the membership function storing unit 207. The result obtained by fuzzy deduction is output, as an output d, to the gain adjusting circuit 208 to be multiplied by a predetermined gain $\alpha$. The resultant value is converted into an analog voltage value by the D/A converter 209. The analog voltage value is then output to the offset generating unit 114.

Figure 5A:
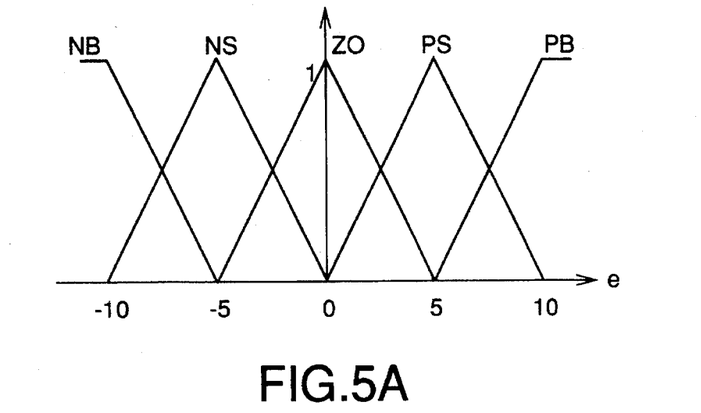
FIG. 5A is a chart showing a membership function set for a difference signal $e$.
Figure 5B:
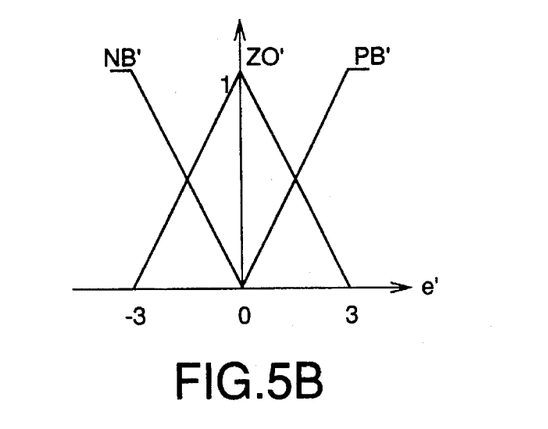
FIG. 5B is a chart showing a membership function set for a difference signal $e'$.
Figure 5C:
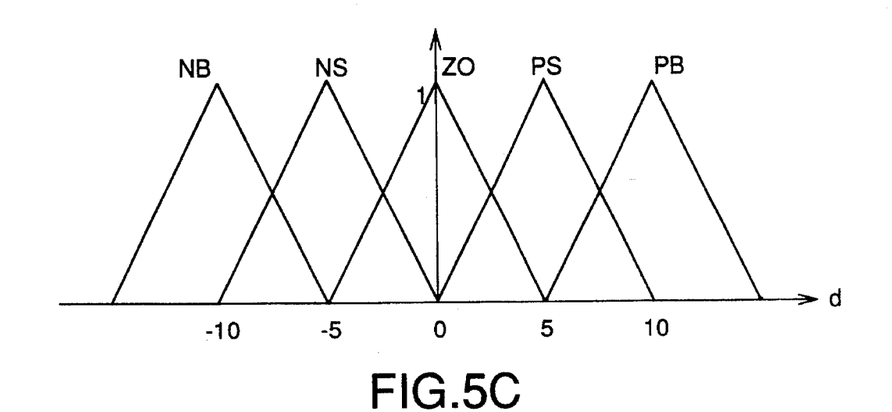
FIG. 5C is a chart showing a membership function set for an output d from the fuzzy operating unit.

In the present embodiment, membership functions such as those shown in FIGS. 5A to 5C are set.

FIG. 5A shows a membership function set for the difference signal e. FIG. 5B shows a membership function set for the difference signal e'. FIG. 5C shows a membership function set for the output d.

The following three factors are considered to be the main causes of tracking noise:

(1) drifts due to temperature, vibration, and the like;

(2) variations in edge shape; and (3) variations in Z-direction feedback.

The difference signals e and e' will be considered with respect to the causes described above. With regard to cause (1), since the drift is slow as compared with the scanning period, the difference signal e is small and constant, and almost no difference signal e' is generated. With regard to cause (2), in a sample electrode substrate having a groove formed by a semiconductor process or the like, although the difference signal e' is indefinite, the difference signal e is small and variations in edge shape are limited to about 0.5 nm at most. That is, there is not much difference between the case of cause (2) and the case of cause (1), and hence almost no difference signal e' is generated. In the case of cause (3), however, both the difference signals e and e' are indefinite and vary in magnitude. If, therefore, these signals are large, a feedback system for tracking is adversely affected, causing the problem of instability. The following deduction rules are set in consideration of the above-described tendencies:

if e=ANY AND e'=$\overline{ZO'}$ THEN d=ZO if e=NB AND e'=ZO' THEN d=PB if e=PB AND e'=ZO' THEN d=NB if e=PS AND e'=ZO' THEN d=NS if e=NS AND e'=ZO' THEN d=PS In these deduction rules, NB is an abbreviation for negative big; PB, for positive big; NS, for negative small; and PS, for positive small, respectively indicating that the corresponding value is large in the negative direction, large in the positive direction, small in the negative direction, and small in the positive direction. ZO' indicates that the corresponding value is close to zero. $\overline{ZO'}$ indicates that the corresponding value is not close to zero.

For example, a MAX-MIN synthesizing method is used for deduction, and a center-of-gravity method is used for de-fuzzyfication to calculate the output d.

Figure 6A:
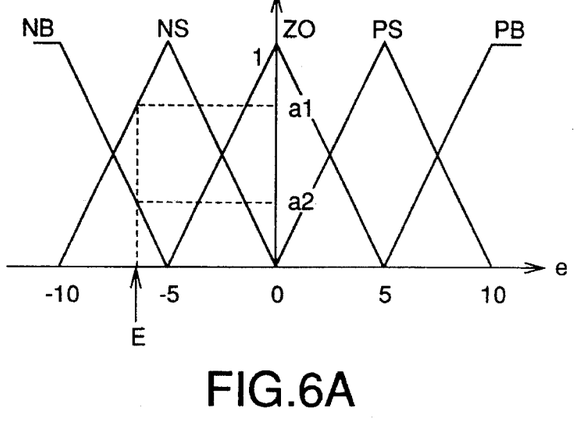
FIGS. 6A to 6C are charts for explaining a method of calculating the output d from the fuzzy operating unit.
Figure 6B:
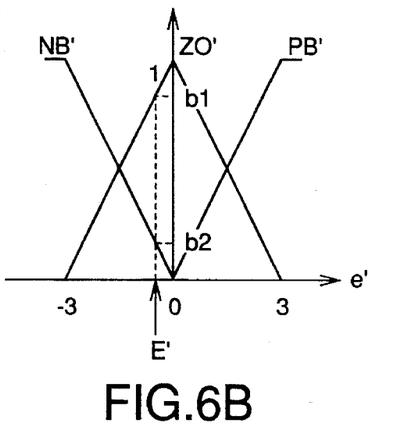

A method of calculating the output d will be described in detail below with reference to FIGS. 6A to 6C.

An output signal from the holding circuit 112 is a voltage value. In this case, control is performed on the assumption that a voltage value and a displacement amount exhibit a one-to-one correspondence, and their relationship is linear. Assume that a difference signal obtained by subtracting an output signal from the reference position setting circuit 204 from the current output signal is represented by E. From the position of the difference signal E in FIG. 6A, values a1 and a2 can be obtained with respect to membership functions NS and NB, respectively. Assume that a difference E-Eo between the current difference signal E and a previous difference signal Eo is represented by E'. In this case, from the position of the difference signal E' in FIG. 6B, values b1 and b2 can be obtained with respect to membership functions ZO' and NB'. Assume that b1>a1>a2>b2.

When the above-described deduction rules are used, the following cut values are obtained with respect to the membership function for the output d (FIG. 5C). According to the first deduction rule, a cut value of ZO of the membership function for the output d is b2. Assume that the MAX-MIN synthesizing method is used and a smaller value is selected in an "AND" operation. Similarly, since cut values of PS and PB become a1 and a2, respectively, the respective functions are cut, as shown in FIG. 6C. Since the MAX-MIN synthesizing method is used, values at a position where functions overlap each other are ORed, i.e., a larger value is selected. The resultant function is expressed by the hatched portion in FIG. 6C.

Figure 6C:
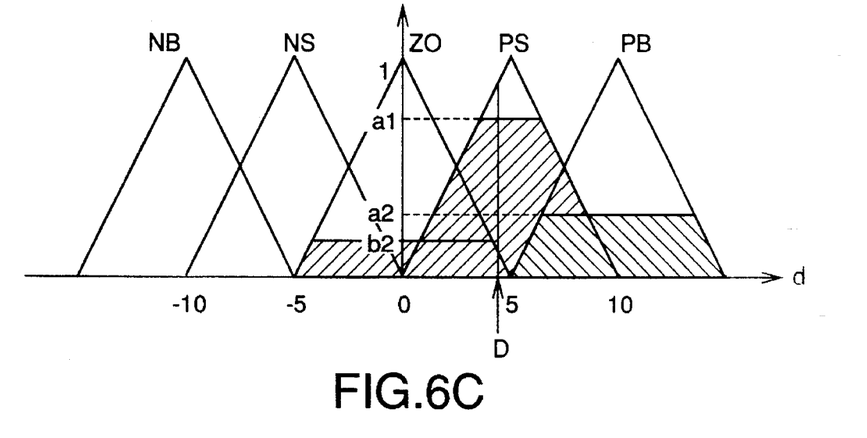

Finally, the center-of-gravity method is used for de-fuzzyfication to obtain the center of gravity (a value D indicated by the arrow in FIG. 6C) of the hatched portion in FIG. 6C, thereby determining the output d.

The operation result of the embodiment will be described below. As a sample, a thin Au film formed on a glass substrate was used. A track groove (e.g., a 2-μm line-and-space) was formed on the Au film. The groove had a depth of about 30 nm and a length of 30 μm. Scanning was performed with a width of 1 μm and a length of 10 μm at 500 Hz.

A case will be described first, in which feedback control was performed with the difference signal e' simply multiplied by the predetermined gain $\alpha$, instead of using the fuzzy operating unit 113 described above.

The tracking precision was about 20 nm, and oscillation occurred because of instability of feedback even when the gain $\alpha$ was small. Observation with an electron microscope clearly indicates that a fluctuation in the edge shape of a track groove is several Å at most. It is apparent that the tracking precision is very poor as compared with the fluctuation.

When control was performed by using the fuzzy operating unit 113, the fluctuation became about 0.1 nm, which was almost the same as the magnitude of fluctuation due to the groove structure. It was confirmed that the tracking precision was greatly improved.

As described above, in the information recording/reproducing apparatus of the present embodiment, an error in edge detection for detecting a track groove is estimated from a change in time required to detect a signal, and a feedback amount is calculated by the fuzzy operating unit in accordance with the estimated error. This mechanism serves to suppress oscillation and the like of the feedback system due to a track groove position detection error, and allows scanning of the probe at high speed while stabilizing tracking control, thereby enabling write, read, and erase operations.

Another example will be described next, in which recording, reproduction, and erasure were performed by the information recording/reproducing apparatus of the an embodiment using an SOAZ.Langmuir-Blodgett (LB) film (two-layer film), as a sample, was stacked on an Au electrode as a recording medium, as disclosed in Japanese Laid-Open Patent Application Nos. 63-161552 and 63-161553.

A track groove was formed in the Au electrode by a semiconductor process, similar to the sample in the above-described example. While the probe was scanned in the X and Y directions with a width of 1 μm and a length of 10 μm, and tracking was performed by using the apparatus having the arrangement shown in FIG. 1, a voltage obtained by superposing continuous pulse waves having peak values of −6 V and +1.5 V was applied, as a bias voltage, between the sample and the probe by the bias circuit 105, thus electrically writing information. Data was extracted from the resultant tunnel current data, and reading of the recorded information was repeated a plurality of number of times. As a result, it was confirmed that the recorded information and the reproduced information coincided with each other. It was also confirmed from the result obtained by performing image processing of the tunnel current that the respective image data obtained by the repetitive reproduction coincided with each other with a very small error, i.e., a precision of 0.1 nm. In addition, when the probe approached the region, on the sample, on which recording was performed, scanning was performed upon superposing a pulse voltage having a peak value of 3 V on the bias voltage. As a result, it was confirmed from the reproduced tunnel current image and extracted information that the recorded information was erased.

Another embodiment of the present invention will be described below.

Figure 3:
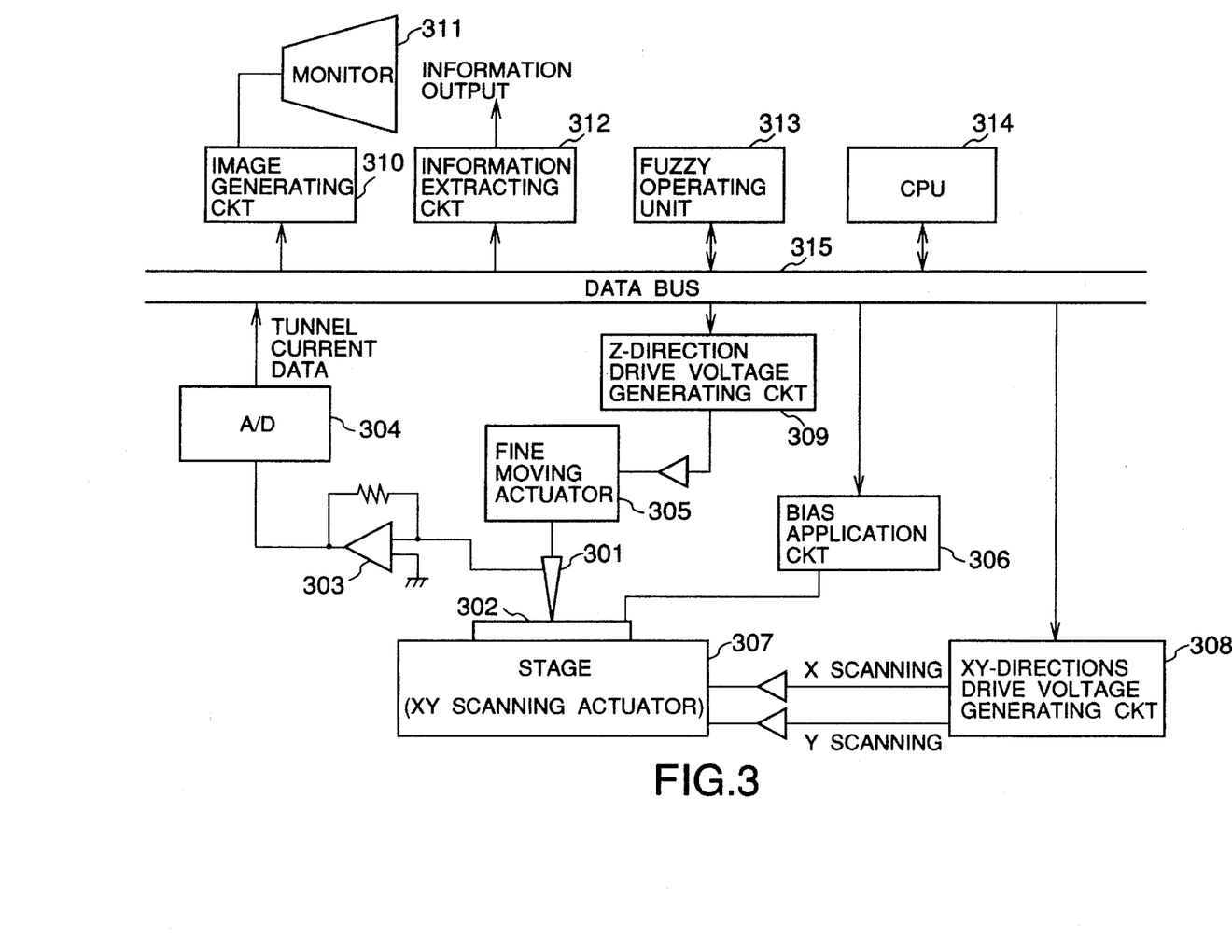
FIG. 3 is a block diagram showing an arrangement of an information recording/reproducing apparatus according to another embodiment of the present invention.

In the above-described embodiment, a digital fuzzy operating unit is used, as an operating circuit, for the control unit of the analog system. However, the overall control system may be designed for digital control. FIG. 3 shows an arrangement of such a control system. When a tunnel current is detected, the current is converted into a voltage signal by an I-V converter 303. The voltage signal is further converted into a digital value by an A/D converter 304, and is output to a data bus 315. Am image generating circuit 310 receives the digital value and outputs it, as an image, to a monitor 311. An information extracting circuit 312 extracts recorded information from the digital value.

Z-direction distance control, information recording control, and XY-direction stage driving control are performed by a CPU 314.

In Z-direction distance control, the CPU 314 calculates a control output as a correction amount from the digital value indicating the difference between a preset target value and a tunnel current value obtained through the A/D converter 304, and the control output is supplied to a Z-direction drive voltage generating circuit 309 through the data bus 315, thus driving an actuator 305. Note that in this control, various control rules, such as PID control, PI control, P control, and I control, can be realized by changing software.

In information recording control, the CPU 314 supplies bit string information, transmitted from an information source (not shown) through the data bus, to a bias application circuit 306. The bias application circuit 306 applies a predetermined pulse voltage to a read DC bias (a DC bias for controlling the distance between a probe 301 and a sample 302, or a DC bias for generating a tunnel current) at a predetermined timing on the basis of the bit string information, thereby forming a bit string on a sample substrate as a recording medium.

XY-direction stage driving control is performed by supplying a scanning voltage value, calculated by the CPU 314, to an XY-direction drive voltage generating circuit 308. In this case, although scanning waveforms may be sequentially calculated by the CPU 314 in real time, a scanning voltage table can be used, which is obtained by correcting the characteristics of piezoelectric elements constituting an XY scanning actuator and prestored in a memory (not shown) arranged on the data bus.

Tracking control is also performed by the CPU 314. The CPU 314 subtracts a reference value corresponding to the reference current value Vref in FIG. 1 from a digital value representing the obtained tunnel current so as to generate a difference signal $e$. The CPU 314 further subtracts a previous difference signal $e$ from the current difference signal $e$ to generate a difference signal $e'$. The CPU 314 supplies both of these difference signals to a fuzzy operating unit 313 through the data bus 315. The fuzzy operating unit 313 calculates a control output by a digital fuzzy operation, and supplies the output to the CPU 314 through the data bus 315. The CPU 314 adds the obtained result, as an offset value, to the current scanning signal, and supplies the resultant signal to the XY-direction drive voltage generating circuit 308, thereby performing tracking control of a stage 307.

Figure 4:
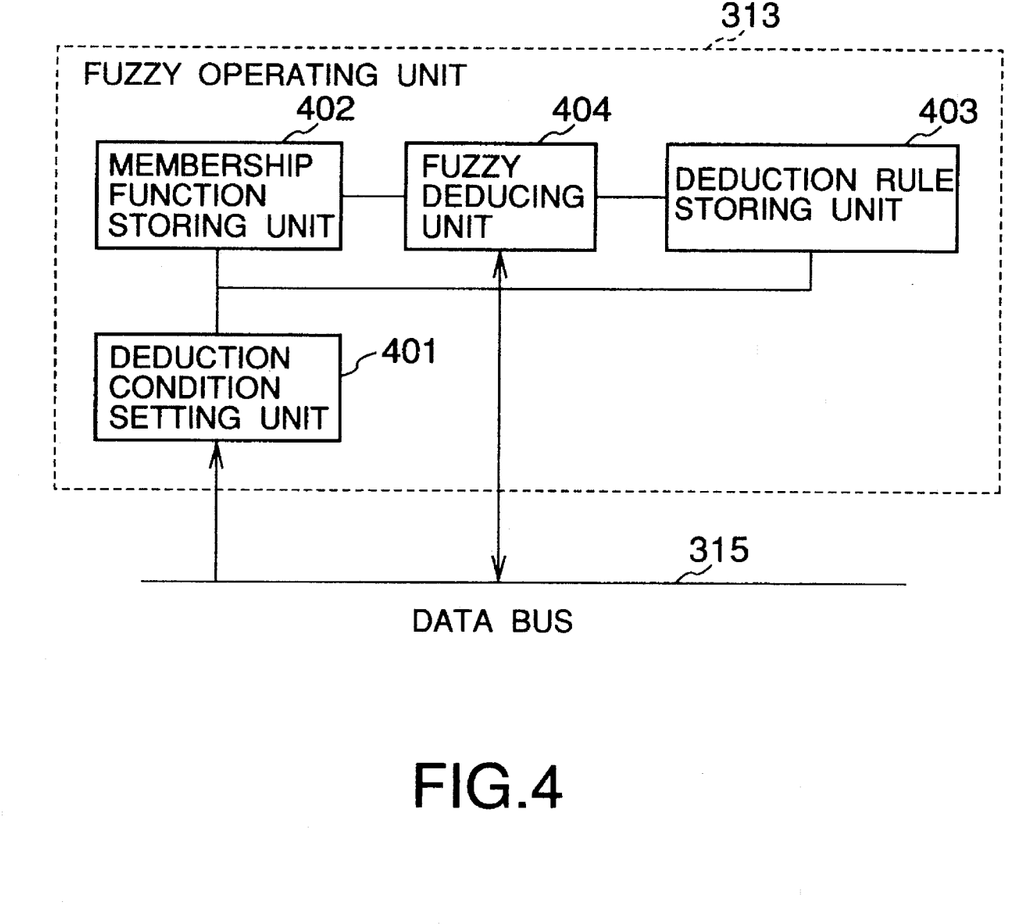
FIG. 4 is a block diagram showing a detailed circuit arrangement of a fuzzy operating unit 313 in FIG. 3.

FIG. 4 shows the internal arrangement of the fuzzy operating unit 313. A fuzzy deducing unit 404 as a central block exchanges data with the data bus 315. The fuzzy operating unit 313 includes a deduction condition setting unit 401 to change membership functions and deduction rules supplied from the CPU 314 and the like. Deduction conditions stored in storing units 402 and 403 can be updated.

With the above-described arrangement, deduction was performed in the same manner as in the arrangement shown in FIG. 1, and evaluation of tracking precision and evaluation of recording/reproduction of information were performed. It was confirmed that the same result as that described above could be obtained.

Each embodiment described above exemplifies the recording/reproducing apparatus for measuring a tunnel current as physical information. However, the present invention can be applied to other systems using small signals such as interatomic force, capacitance, magnetic flux, and magnetic force signals. In the arrangement of this embodiment, fuzzy control based on digital value calculations is used. However, an analog operating circuit capable of faster calculations may be used for the fuzzy operating unit in FIG. 1. In addition, triangular functions are used as membership functions, and the MAX-MIN center-of-gravity method is used as a deduction method. However, the mechanism of the present invention imposes no limitations on membership functions, the definition contents of deduction rules, and a deduction method. For example, control and the like can be performed in consideration of the characteristics (hysteresis, creeping, and the like) of piezoelectric elements constituting an actuator by changing the membership functions and the deduction rules.

What is claimed is:

1. An information recording or reproducing apparatus for performing at least one of recording of information on and reproduction of information from a recording medium having a track groove by using a probe, the apparatus comprising:

a probe;

moving means for effecting relative movement between said probe and the recording medium in a medium surface direction;

driving means for supplying a predetermined driving signal to said moving means so as to effect a predetermined relative movement between said probe and the recording medium;

voltage applying means for applying a voltage between said probe and the recording medium;

detection means for detecting physical information which is generated upon application of the voltage;

means for detecting an edge position of said track groove from the detected physical information; and means for generating a signal indicating a relative deviation amount between said relative movement and said edge position using fuzzy deduction when said edge position detecting means detects the edge position, wherein said signal indicating said deviation amount is supplied to said moving means so that relative deviation between said relative movement and said edge position is corrected.

2. An apparatus according to claim 1, wherein said signal generating means comprises:

means for holding said drive signal supplied to said moving means when said edge detecting means detects said edge position;

means for generating a first difference signal indicating a difference between the held drive signal and a predetermined reference signal;

means for generating a second difference signal indicating a difference between said first difference signal generated upon a most recent prior detection of edge position and a latest first difference signal;

a fuzzy deducting circuit for performing fuzzy deduction by operating the first and second difference signals using predetermined fuzzy deduction rules and membership functions; and means for generating a signal indicating a relative deviation amount between said relative movement and said edge position on the basis of an output of said fuzzy deducting circuit.

3. An apparatus according to claim 1, wherein said physical information is tunneling current.

4. An apparatus according to claim 1, wherein edge position detecting means detects the edge position on the basis of variation of said physical information generated when said probe passes an edge portion of said track groove.

5. A method of performing at least one of recording of information on and reproducing information from a recording medium having a track groove by using a probe, said method comprising the steps of:

effecting a relative movement between said probe and the recording medium in a medium surface direction;

applying a voltage between said probe and the recording medium;

detecting physical information generated upon application of the voltage;

detecting an edge position of the track groove from the detected physical information;

generating a signal indicating a relative deviation amount between said relative movement and said edge position using fuzzy deduction when edge position is detected; and correcting a relative deviation between said relative movement and said edge position on the basis of said signal indicating said relative deviation amount.

6. A method according to claim 5, wherein said physical information is tunneling current.

7. A method of performing at least one of recording of information on and reproduction of information from a recording medium using a probe while effecting relative movement between the probe and the recorded medium having a track groove with moving means, said method comprising the steps of:

supplying a predetermined drive signal to the moving means so as to effect a predetermined relative movement between the probe and the recording medium in a medium surface direction;

detecting physical information generated by the interaction between the probe and the recording medium;

detecting an edge position of the track groove from the detected physical information;

holding the drive signal supplied to the moving means when the edge position is detected; and generating a correction value for correcting the predetermined relative movement using the held drive signal and fuzzy deduction.

8. An information recording or reproducing apparatus for performing at least one of recording of information on and reproduction of information from a recording medium having a track groove by using a probe, the apparatus comprising:

a probe;

moving means for effecting relative movement between said probe and the recording medium in a medium surface direction;

driving means for supplying a predetermined drive signal to said moving means so as to effect a predetermined relative movement between said probe and the recording medium;

detection means for detecting physical information generated by the interaction between said probe and the recording medium;

means for detecting an edge position of the track groove from the detected physical information;

means for holding a drive signal supplied to said moving means when said edge detecting means detects the edge position; and means for generating a correction value for correcting the predetermined relative movement using the held drive signal and fuzzy deduction.

* * * * *

UNITED STATES PATENT AND TRADEMARK OFFICE
CERTIFICATE OF CORRECTION

PATENT NO. : 5,517,482
DATED : May 14, 1996
INVENTOR(S) : SHUNICHI SHIDO, et al

It is certified that error appears in the above-indentified patent and that said Letters Patent is hereby corrected as shown below:

ON THE COVER PAGE

Insert  --Related U.S. Application Data

[62]   Continuation of Application No. 08/061,312 filed May 14, 1993, now abandoned--.

COLUMN 1:

Line 4, Insert:  --This application is a continuation of Application No. 08/061,312 filed May 14, 1993, now abandoned.--.

COLUMN 6:

Line 63, "the" should be deleted.

UNITED STATES PATENT AND TRADEMARK OFFICE
CERTIFICATE OF CORRECTION

PATENT NO. : 5,517,482
DATED : May 14, 1996
INVENTOR(S) : SHUNICHI SHIDO, et al

It is certified that error appears in the above-indentified patent and that said Letters Patent is hereby corrected as shown below:

COLUMN 7:

Line 12, "of number" should be deleted.
Line 20, "sample," should read --sample--.

Signed and Sealed this

Twelfth Day of November, 1996

Attest:

BRUCE LEHMAN

Attesting Officer          Commissioner of Patents and Trademarks